United States Patent [19]

Dorwart

[11] Patent Number: 4,706,981

[45] Date of Patent: Nov. 17, 1987

[54] VEHICULAR SPRAY DAMPENING DEVICE

[76] Inventor: Richard E. Dorwart, P.O. Box 36208, Fayetteville, N.C. 28303

[21] Appl. No.: 920,156

[22] Filed: Oct. 17, 1986

[51] Int. Cl.$^4$ ............................................. B62D 25/16
[52] U.S. Cl. ............................... 280/154.5 R; 239/290
[58] Field of Search ................ 280/154.5 R; 296/1 S, 296/91; 239/290

[56] References Cited

U.S. PATENT DOCUMENTS

| | | | |
|---|---|---|---|
| 3,213,956 | 10/1965 | Cockerell | 180/126 |
| 3,743,343 | 7/1973 | Grote, Sr. et al. | 280/154.5 R X |
| 3,834,732 | 10/1974 | Schons | 280/154.5 R |
| 4,192,522 | 3/1980 | Morgan | 280/154.5 R |
| 4,334,694 | 6/1982 | Iwanicki | 280/154.5 R |
| 4,486,046 | 12/1984 | Whitney et al. | 280/154.5 R X |
| 4,585,242 | 4/1986 | Sparks | 280/154.5 R X |

Primary Examiner—John J. Love
Assistant Examiner—Michael Mar
Attorney, Agent, or Firm—Mills & Coats

[57] ABSTRACT

The invention herein relates to a spray dampening device for use in connection with tractor trailers, dump trucks, buses and other vehicles which tend to produce a large amount of spray in wet conditions. Air flow generated by the forward movement of the vehicle is channeled through a manifold employed over the wheels of the vehicle. The manifold diverts the air flow downwardly across the outside of the tire thereby preventing excessive spray.

7 Claims, 11 Drawing Figures

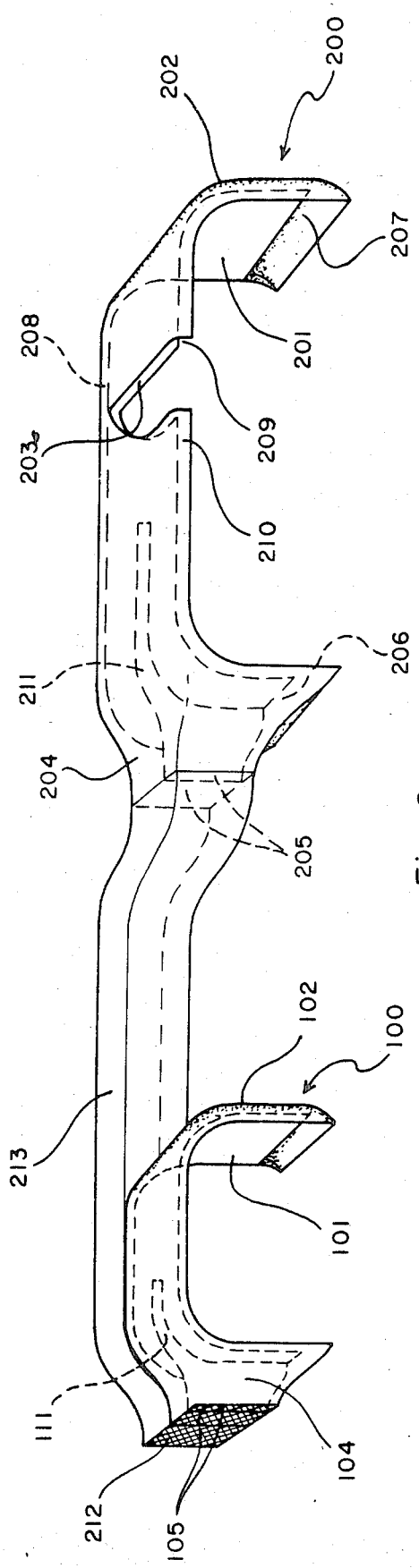
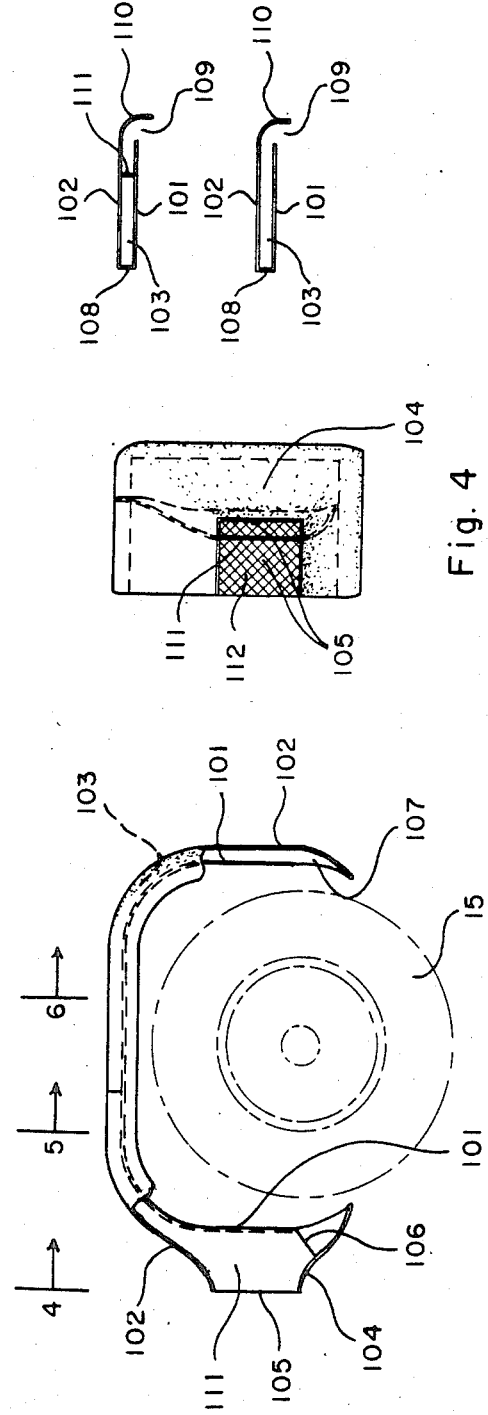

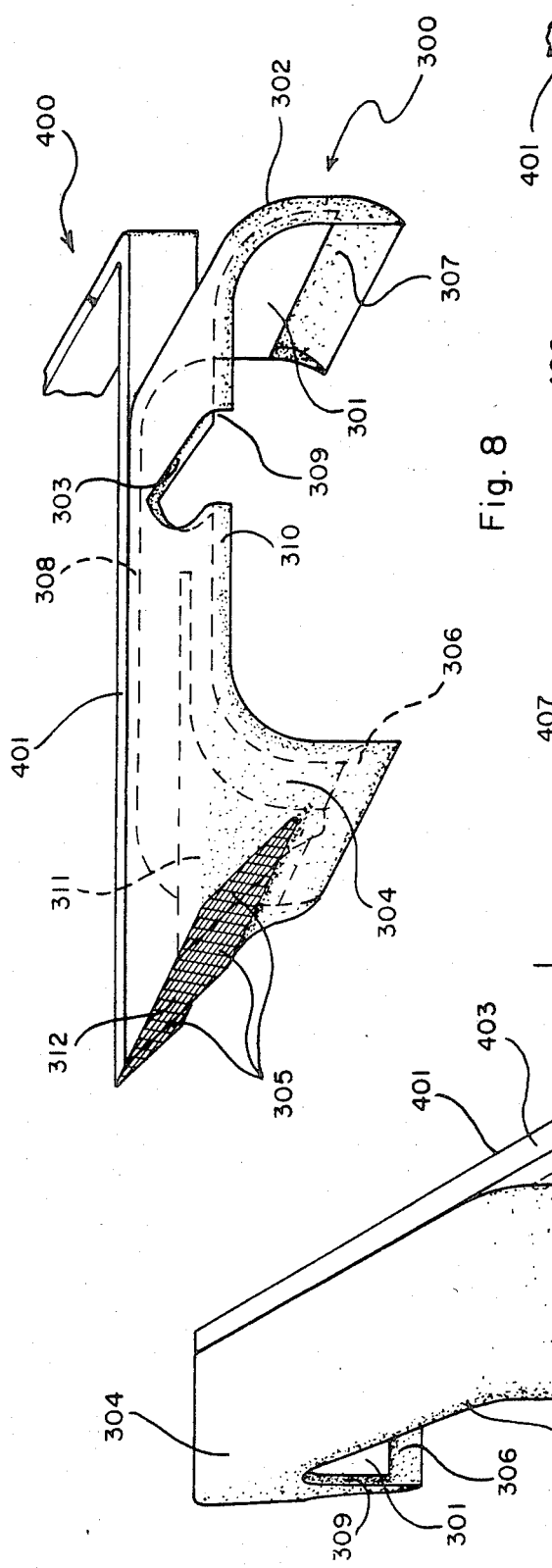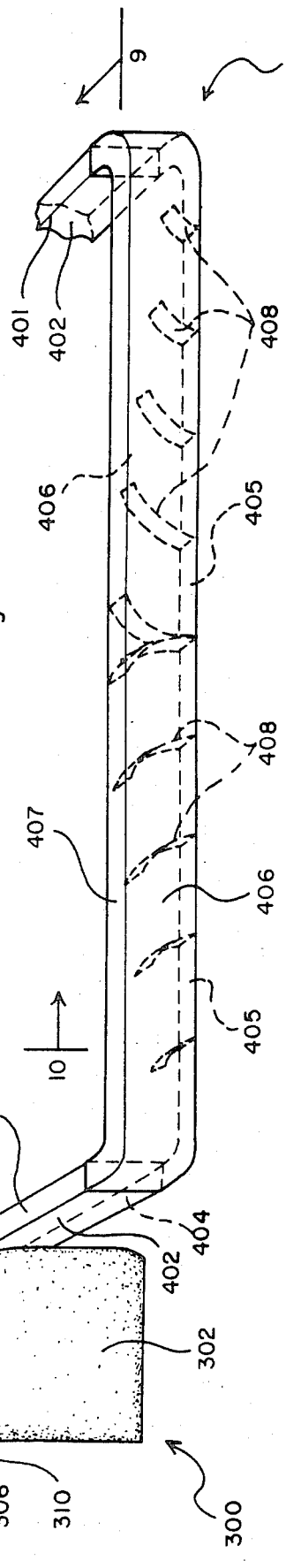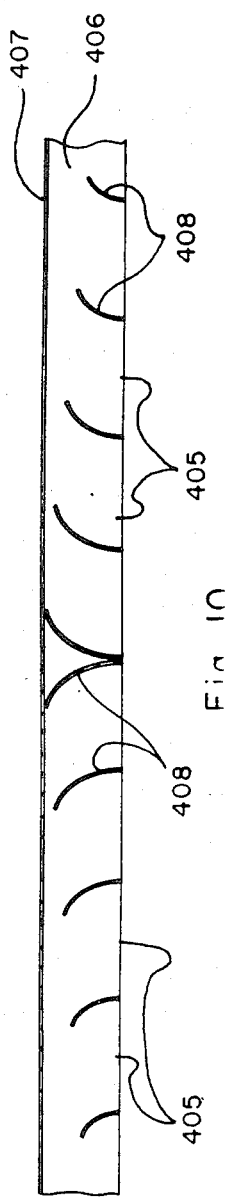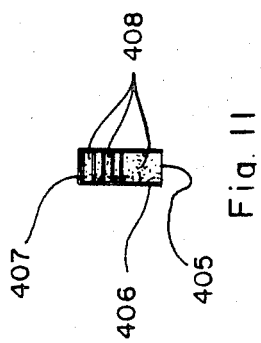
Fig. 8
Fig. 9
Fig. 10
Fig. 11

VEHICULAR SPRAY DAMPENING DEVICE

FIELD OF INVENTION

The present invention relates generally to safety accessories for motor vehicles and more particularly to spray dampening means for reducing spray from a tractor trailer rig or the like.

BACKGROUND OF THE INVENTION

One of the principal means used today for transporting goods is by large tractor trailers. Such tractor trailers are operated on the same highways used by ordinary motorists driving much smaller passenger vehicles. Thus, there is great concern for increasing the safety of operation of tractor trailer rigs.

A major disadvantage of tractor trailers on the highway, at least from the point of view of other motorists, is that in wet conditions, mist and/or snow is thrown laterally of the tractor trailer rig which obstructs the vision of motorists which are following or passing the tractor trailer rig. In some instances, the obstruction of vision is almost total. The danger inherent in the obstruction of vision has undoubtedly contributed to countless accidents resulting in personal injury and loss of life.

Previously, it has been suggested in the patents to Whitney et al and Grote Sr et al, U.S. Pat Nos. 4,486,046 and 3,743,343 respectively, to control lateral discharge of spray or mists by channeling air flow towards the rear of the truck in a direction perpendicular to the rotational axis of the wheels. The patent to Schons, U.S. Pat No. 3,834,732, suggests a spray collector disposal over the wheels which collects spray and discharges the same underneath the vehicle. Finally, the patent to Sparks, U.S. Pat No. 4,585,242 discloses a forced air diverter in the form of a downwardly opening channel having a plurality of air scoops along one side for receiving air which is deflected downward by a plurality of vanes secured within the channel. None of these solutions, however, is entirely satisfactory since they fail to reduce rearward as well as lateral spray which may be picked up by turbulent air beneath the vehicle and laterally discharged.

SUMMARY AND OBJECTS OF THE INVENTION

After much research and study into the forgoing problems, the invention herein has been developed to reduce the amount of spray thrown from larger vehicles such as tractor trailers. The above is accomplished by equipping tractor trailer rigs with fender-like manifolds which extend around the wheels of the tractor trailer rig. An air scoop on the front of the manifold catches air as the tractor trailer moves forwardly along the highway. The air flowing through the manifold is then directed through a slot-like opening extending along the outer edge of the manifold and forced downwardly across the outside of the wheels by means of a flare. The downwardly flowing air naturally reduces the amount of spray thrown laterally of the tractor trailer rig.

Accordingly, it is an object of the present invention to increase the safety of operation of tractor trailer rigs on the highways, particularly in wet condtions.

Another object of the present invention is to reduce or eliminate the obstruction of vision caused by the spray of mist and/or snow from tractor trailers.

Another object of the present invention is to achieve the forgoing objects by providing a fender-like manifold which directs a stream of air downwardly across the outside of the vehicle's wheels thereby suppressing and dampening the spray.

Another object of the present invention is to achieve the forgoing objects by using the momentum of the tractor trailer rig to generate the flow of air through the manifolds.

Another object of the present invention is to provide a fender-like manifold for directing air flow which is relatively simple in construction and inexpensive to manufacture.

Another object of the present invention is to provide a fender-like manifold for directing air flow which can be incorporated into existing vehicles without alterations.

Other objects and advantages of the present invention will become apparent and obvious from a study of the following description and the accompanying drawings which are merely illustrative of such invention.

BRIEF DESCRIPTION OF DRAWINGS

FIG. 2 is a left side perspective view of the spray dampening means for the tractor portion of a tractor trailer rig;

FIG. 3 is a partially cut away left side elevation of the front-wheel manifold thereof;

FIG. 4 is a front elevation of the front wheel manifold thereof;

FIG. 5 is a section view of the front-wheel manifold thereof taken through line 4—4 of FIG. 3;

FIG. 6 is a section view of the front-wheel manifold thereof taken through line 5—5 of FIG. 3;

FIG. 8 is a perspective view from the left side of the spray dampening means for the trailer portion of a tractor trailer rig;

FIG. 9 is a perspective view from the rear thereof;

FIG. 10 is a longitudinal section view taken through the manifold extending around the rear end of trailer portion; and FIG. 11 is a transverse section view thereof.

VEHICULAR SPRAY DAMPENING MEANS

Figure 1:
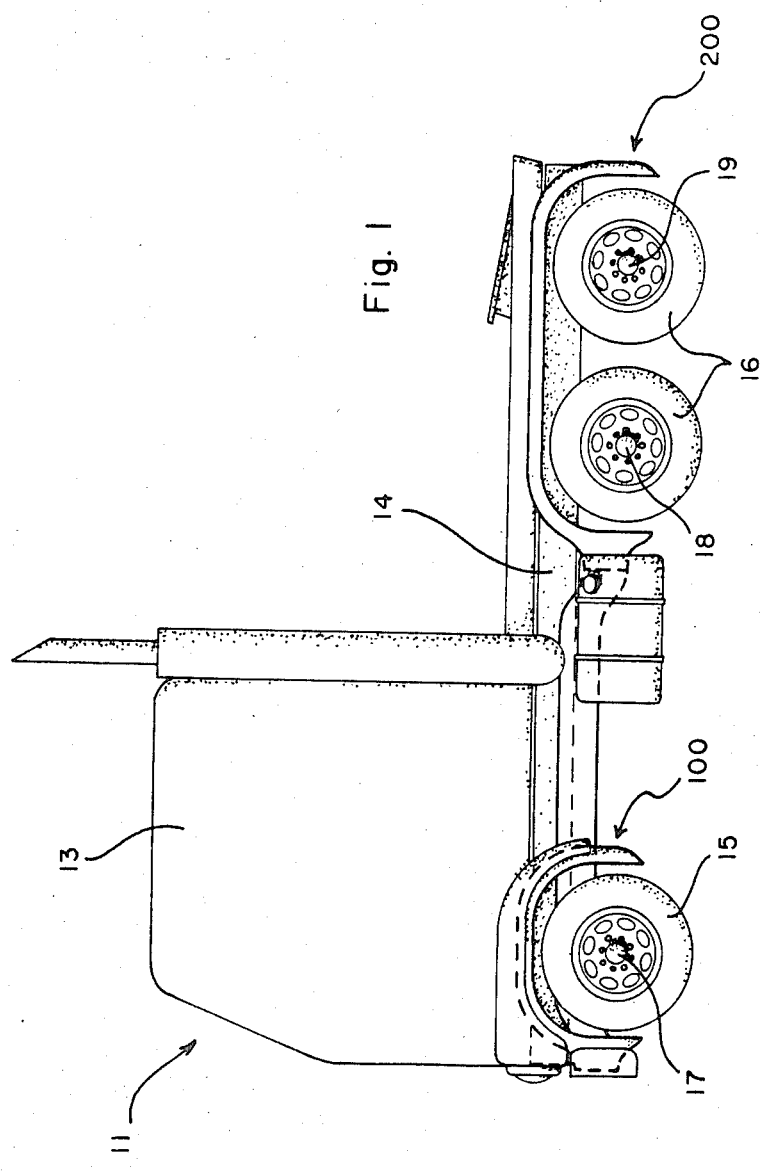
FIG. 1 is a left side elevation of the tractor portion of a tractor trailer rig incorporating the spray dampening means of the present invention.
Figure 7:
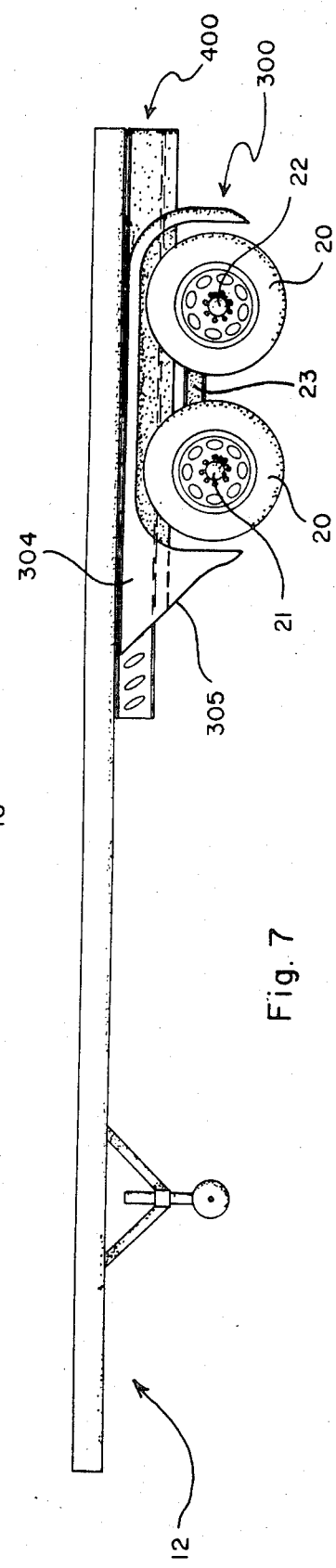
FIG. 7 is a left side elevation of the trailer portion of a tractor trailer rig incorporating the spray dampening means of the present invention.

Referring now to the drawings, and particularly to FIGS. 1 and 7, there is illustrated a tractor trailer rig incorporating one embodiment of the vehicular spray dampening means of the present invention.

The tractor trailer rig includes a tractor portion indicated generally at 11 (FIG. 1) and a trailer portion indicated generally at 12 (FIG. 7) which may be removably connected to tractor portion 11. The tractor portion 11 includes a cab 13 mounted on a chassis 14 which is itself supported by front and rear wheels, 15 and 16 respectively. Front wheels 15 are journaled for rotation about a single axle 17, while rear wheels 16 are journaled for rotation about two adjacent axles 18 and 19. In total, there are two front wheels 15 and eight rear wheels 16.

The trailer portion 12 includes connecting means (not shown) at the front end thereof for engaging the rear end of tractor portion 11. The rear end of trailer portion 12 is supported by eight rear wheels 20 journaled for rotation about two adjacent axles 21 and 22 which are secured to a movable wheel frame 23.

In wet conditions, tractor trailer rigs of the type described produce a fine mist or spray which is thrown laterally of the tractor trailer rig. The lateral spray from such vehicles obstructs the vision of other motorists, particularly those driving smaller passenger vehicles, creating hazardous driving conditions.

The vehicular spray dampening means of the present invention is particularly designed to reduce or eliminate lateral spray, and to a lesser extent rearward spray which may be picked up by turbulent air beneth the tractor trailer rig and laterally discharged. Basically, the vehicular spray dampening means includes a plurality of generally U-shaped manifolds indicated at 100, 200 and 300 which are employed over the wheels of the tractor trailer rig. The manifolds channel air flow generated by the forward movement of the tractor trailer rig downward adjacent the wheels of the tractor trailer rig which forcefully pushes the spray downwardly.

Referring now specifically to manifold 100, which is employed over the front wheels 15 of tractor portion 11, it is seen that the same includes an inner wall 101 and an outer wall 102 defining an air flow chamber 103 therebetween. An air collector or scoop 104 is integrally formed with outer wall 102 at the front of manifold 100 and defines an air intake 105 which can be best seen in FIG. 2. A front opening 106 is formed between inner wall 101 and outer wall 102 just below air intake 105 to direct air downward in front of wheel 15. Likewise, a rear opening 107 is formed between inner wall 101 and outer wall 102 at the opposite end of manifold 100 to direct air downward behind wheel 15.

The inner wall 101 and outer wall 102 are joined along one edge by a side wall 108 as is clearly shown in FIGS. 4 and 5. Along the opposite edge, the inner wall 101 and outer wall 102 define a continuous, U-shaped side opening 109. The outer wall 102 is curved to form an outer lip or flare 110 which extends over side opening 109 to direct air downward along the outside of wheel 15.

In the preferred embodiment of the invention, the air flow chamber 103 is divided to form plural channels in order to direct more air to the rear of manifold 100. This is accomplished by placing a generally vertical air flow divider 111 in the forward portion of the manifold which extends from the air scoop 104 approximately midway through air flow chamber 103. Also, the preferred embodiment includes a screen 112 covering air intake 105 to prevent trash and other debris from entering manifold 100.

Manifold 100 is employed over front wheel 15 of tractor portion 11 and secured by weldment or other suitable means to chassis 14. Since fastening means of this type are well known to those skilled in the art further discussion of the same is omitted. Manifold 100 fits easily into the fender of tractor portion 11 with no modifications other than the provision of an opening in the front of tractor portion 11 to accommodate air intake 105.

In use, manifold 100 channels air flow generated by the forward movement of tractor portion 11 to forcefully push spray or mist downward. Air enters manifold 100 through air intake 105. Inner wall 101 diverts a portion of the air flow downward through front opening 106 which has the effect of dampening spray in front of wheel 15. The remaining air flow is diverted upwardly into air flow chamber 103 and is compressed by the narrowing inner and outer walls 101 and 102. A large part of the compressed air escapes manifold 100 through side opening 109 and is deflected downward along the outside of wheel 15 by outer lip or flare 110 effectively suppressing lateral spray. The remaining air flow is directed downward through rear opening 107 to dampen rearward spray from wheel 15.

The spray and mist generated by the rear wheels 16 of tractor portion 11 is dampened in a similar manner by manifold 200 which is employed over rear wheels 16. Manifold 200 is constructed much like manifold 100 having an inner wall 201, an outer wall 202, a side wall 208, an air collector or scoop 204 and an air flow divider 211. Unlike manifold 100, an air duct 213 extends from air collector or scoop 204 to the front of tractor portion 11. A screen 212 mounted on the forward end of air duct 213 prevents entry of trash and other debris.

Air flow enters manifold 200 through air intake 205 after passing through air duct 213. A portion of the air flow is diverted downwardly through a front opening 206 defined by the forward ends of the inner wall 201 and outer wall 202. This downward air flow through front opening 206 effectively dampens spray thrown forwardly of wheels 16. The remaining air is directed into an air flow chamber 203 between inner and outer walls 201 and 202. Much of the air flow through air chamber 203 is channeled through a side opening 209 and directed downwardly along the outside of wheels 16 by an outer lip or flare 210 integrally formed with outer wall 202. The air flow which does not escape through front opening 206 or side opening 209 is directed through a rear opening 207 behind wheels 16 effectively reducing rearward spray from wheels 16.

Referring now specifically to FIGS. 7-9 a vehicular spray dampening means suitable for use in connection with the trailer portion 12 of a tractor trailer rig is shown which includes a wheel manifold 300 of the type previously described and a separate tube-like manifold 400 extending around the rear of trailer portion 12.

Manifold 300 includes an inner wall 301, an outer wall 302, a side wall 308, an air collector or scoop 304 and an air flow divider 311. The air collector or scoop 304 is enlarged as compared to manifolds 100 and 200 to increase the air flow through manifold 300 thereby increasing the effectiveness thereof. Manifold 300 should be mounted to wheel frame 23 so as to be moveable with wheels 20.

When trailer portion 12 is in forward motion, the air flow generated enters manifold 300 through intake 305. A screen 312 prevents entry of trash and other debris. A portion of the air flow is diverted downwardly through a front opening 306 defined by the ends of the inner and outer walls 301 and 302. The downward rush of air through front opening 306 mitigates the spray thrown forwardly of wheels 20. The remaining air is directed upwardly into an air flow chamber 303 between inner and outer walls 301 and 302. Once in air flow chamber 303, the air flow is channeled through side opening 309 which is defined by the edge of inner and outer walls 301 and 302 adjacent the outer side of wheels 20. Air flowing through side opening 309 is directed downwardly by an outer lip or flange 310 which is integrally formed with outer wall 302. It is this downward rush of air through side opening 309 which forcefully suppresses lateral spray thrown from wheels 20. Any air flow which does not escape through front opening 306 or side opening 309 is directed downwardly through rear opening 307 and effectively reduces rearward spray from wheels 20.

Tube-like manifold 400, which is separate from wheel manifold 300, is adapted to mitigate spray discharged from the rear of trailer portion 12. Manifold 400 includes a pair of air collecting tubes 401 extending along opposite sides of trailer portion 12 and having side walls 402, a top wall 403 and a bottom wall 404. Air collecting tubes 401 are interconnected by a downwardly opening channel 405 extending along the rear of trailer portion 12. Channel 405 includes a pair of side walls 406 interconnected by a top wall 407. A plurality of vanes 408 are angularly disposed within channel 405 and secured at their side edges to opposite side walls 406. The vanes 408 direct air flow through channel 405 downwardly and serve to distribute air flow evenly along the entire length of channel 405.

Tube-like manifold 400 is secured to the trailer by weldment or other suitable means which are well known to those skilled in the art. Air flow enters tubes 401 on either side of trailer portion 12 at the forward end thereof. Air flow is then directed into channel 405 extending across the rear of trailer portion 12 and diverted downwardly by vanes 408. This downward air flow greatly reduces discharge of spray and mist from the rear of trailer portion 12.

It is anticipated that in colder climates, small amounts of rain, ice or snow may enter the manifolds surrounding the wheels. In these circumstances it may be desirable to channel warm air from the engine or exhaust into the manifolds to prevent freezing. Fans or other suitable means may be necessary to maintain such a forced air flow. Since forced air systems of this type are well-known to those skilled in the art, further discussion of the same is not deemed necessary.

From the foregoing it is apparent that the spray dampening means herein discribed greatly reduces the discharge of spray and mist from the wheels of a tractor trailer rig and thereby increases the safety of operation of such vehicles. It is understood, however, that the spray dampening means may be used in other vehicles such as buses, dump trucks, as well as ordinary passenger vehicles.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

I claim:
1. A vehicular spray dampening means for reducing the discharge of spray and mist from the wheels of a vehicle comprising: an inverted, generally U-shaped manifold disposed over the wheels of the vehicle, said manifold including a lower inner wall and an upper outer wall joined along one edge and open at the opposite edge so as to define an inverted, generally U-shaped side opening adjacent the outer side of said wheels; an air scoop integrally formed with said outer wall at the forward portion of said manifold which communicates with the interior thereof for creating an air flow through said manifold when said vehicle is in forward motion, said air flow entering said air scoop and exiting said side opening; and means adjacent said side opening for deflecting said air flow downwardly adjacent the outer side of said wheels such that said downward air flow forcefully suppresses spray and mist discharged from said wheels.

2. The vehicular spray dampening means of claim 1 further including openings at opposite ends of said manifold for directing air flow downwardly in front of and behind said wheel.

3. The vehicular spray dampening means of claim 1 further including screen means secured to said air scoop for preventing trash and other debris from entering said manifold.

4. The vehicular spray dampening means of claim 1 further including an air flow divider defining plural air flow channels within said manifold so that air is directed to the rear of said manifold.

5. The vehicular spray dampening means of claim 1 wherein said deflecting means includes a flare integrally formed with said outer wall and extending outwardly and downwardly over said side opening.

6. The vehicular spray dampening device of claim 1 further including an inverted generally U-shaped manifold extending around the rear edge of the vehicle and connected to two tubular manifolds extending forward in the direction of motion of the vehicle, each tubular manifold opening into an air scoop at the forward end such that an air flow is collected into the manifolds, communicates to the rear inverted U-shaped manifolds, and is directed downwards by internal directing means and is forcefully discharged so as to suppress mist and spray discharged from the rear of the vehicle.

7. The vehicular spray dampening device of claim 6 incorporating within the rear U-shaped manifold a plurality of internal vanes for directing the air flow downwardly.

* * * * *